United States Patent
Noorizadeh et al.

(10) Patent No.: US 12,394,410 B2
(45) Date of Patent: Aug. 19, 2025

(54) ACTION TOPIC ONTOLOGY

(71) Applicant: Bank of America Corporation, Charlotte, NC (US)

(72) Inventors: Emad Noorizadeh, Plano, TX (US); Rajan Jhaveri, Plano, TX (US); Jennifer Russell, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 338 days.

(21) Appl. No.: 17/993,038

(22) Filed: Nov. 23, 2022

(65) Prior Publication Data

US 2024/0169979 A1    May 23, 2024

(51) Int. Cl.
G06F 40/30     (2020.01)
G06F 40/205    (2020.01)
G10L 15/18     (2013.01)
G10L 15/22     (2006.01)

(52) U.S. Cl.
CPC ........ G10L 15/1815 (2013.01); G06F 40/205 (2020.01); G06F 40/30 (2020.01); G10L 15/1822 (2013.01); G10L 15/22 (2013.01)

(58) Field of Classification Search
CPC . G10L 15/1815; G10L 15/1822; G10L 15/22; G06F 40/205; G06F 40/30
See application file for complete search history.

(56) References Cited

U.S. PATENT DOCUMENTS

| | | | |
|---|---|---|---|
| 2007/0198248 A1* | 8/2007 | Yasutaka | G10L 15/1822 704/9 |
| 2014/0337383 A1* | 11/2014 | Boyle | G06F 16/243 707/780 |
| 2021/0105361 A1* | 4/2021 | Bergher | H04M 3/5183 |
| 2021/0295347 A1* | 9/2021 | Maheswaran | G06F 17/18 |
| 2022/0028378 A1* | 1/2022 | Jones | G06F 16/9532 |
| 2022/0051665 A1* | 2/2022 | Bade | G06N 7/01 |

* cited by examiner

*Primary Examiner* — Sonia L Gay
(74) *Attorney, Agent, or Firm* — Weiss & Arons LLP

(57) ABSTRACT

Apparatus, methods and systems for an utterance parsing system is provided. The system may include a receiver, a tokenizer, a semantic role classifier, an action topic ontology and a semantic relationship builder. The receiver may receive an utterance. The tokenizer may tokenize the utterance into tokens. The semantic role classifier may determine which tokens are candidates for semantic role classification. The semantic role classifier may identify a semantic role for each candidate token. The semantic role classifier may determine that one semantic role is an action, and that one semantic role is a topic. The semantic role classifier may determine a class that corresponds to the topic-token, and a class that corresponds to the action-token. The action topic ontology may store the classes and one or more relationships between the classes. The semantic relationship builder may determine a vector defining a relationship between the action-token and the topic-token.

14 Claims, 9 Drawing Sheets

| DEFINITIONS OF SEMANTIC CLASSIFIERS: | | |
|---|---|---|
| ACTION | What is happening in a sentence | A verb |
| TOPIC | What the action is happening to | A noun/compound noun |
| TOPIC MODIFIER | Term describing the topic | An adjective |
| ENTITY | Parameter of the topic | A noun/compound noun |

FIG. 4

ACTION TOPIC ONTOLOGY

FIELD OF TECHNOLOGY

Aspects of the disclosure relate to natural language processing.

BACKGROUND OF THE DISCLOSURE

In recent years, entities have decreased human interactions with callers in favor of interactive voice response systems ("IVRs"). These IVRs communicate with humans using a variety of communication methods. These communication methods include telephone calls, short messaging service ("SMS") messages, multimedia messaging service ("MMS") messages, chats, emails and other suitable communication methods.

The IVRs may receive the queries in natural language. Natural language may be understood to mean a language that a human speaks, understands and/or writes. The IVR may be a computer system that understands computer-readable queries. However, the IVR may be unable to understand a natural language query (also referred to herein as an utterance).

Therefore, in order for the IVR to understand the natural language query, it would be desirable for the IVR to translate the natural language query into a computer-readable query. It would be further desirable for the IVR to utilize an ontology to translate the natural language query into a computer-readable query. It would be further desirable for the IVR to generate a response to the query. It would be further desirable for the IVR to translate the response into natural language in the event that the response is generated in a computer-readable language.

SUMMARY OF THE DISCLOSURE

An action topic ontology is provided. The action topic ontology may be an entity-specific dictionary. The action topic ontology may build relationships between actions, topics, topic modifiers and entities. Upon receipt of a natural language query, semantic roles may be extracted from the query. Semantic role extraction may involve identifying key components of the query and tagging each of the key components with a semantic role. A key component may be a token, or a word, included in a query. A key component may be a token or a word that is informative in understanding the intent of the query. Examples of semantic roles may include following: action, topic, topic modifier, entity, question and negation.

The terms semantic roles as used herein are found and described in more detail in co-pending, commonly-assigned, U.S. patent application Ser. No. 17/993,019, filed on Nov. 23, 2022, entitled, "DYNAMIC SEMANTIC ROLE CLASSIFICATION", and co-pending, commonly-assigned, U.S. patent application Ser. No. 17/993,029, filed on Nov. 23, 2022, entitled, "SEMANTIC FRAME BUILDER", both of which are hereby incorporated by reference herein in their entireties.

Upon extraction of a semantic role for a natural language query, a subsystem may look up the tagged semantic roles within the action topic ontology. The subsystem may determine whether the tagged semantic roles are appropriate, applicable and related to each other. The subsystem may identify a response to the natural language query based on the determination of the relationships within the query. The relationships may include a relationship between a token and its semantic role and another token and its semantic role.

The ontology may be a knowledge graph that shows relationships between actions, topics, topic modifiers and entities.

It should be noted that the ontology may be preferably a static knowledge graph, while the semantic extraction may be dynamically assigned to a query. As such, the combination of the static knowledge graph and the dynamic semantic extraction may increase the accuracy of determining intent of a query.

Although the ontology may be preferably static, periodically, the ontology may be updated. In some embodiments, the ontology may be dynamic, and therefore, dynamically updated.

In an example, a user may utter, or otherwise electronically communicate, show my recent transactions. The semantic extraction may tag the token show with an action semantic role. The action semantic role may be a verb of the sentence. The semantic extraction may tag the token transactions with a topic semantic role. The topic semantic role may be the subject of the sentence. The action semantic role and the topic semantic role may be related to each other.

It should be noted that each action may be associated with one topic within the sentence. As such, in some embodiments, if a token that would otherwise be tagged as a topic is not associated with an action, it may not be tagged as a topic because each topic may be associated with an action.

The semantic extraction may tag the token recent with a topic modifier semantic role. The topic modifier semantic role may be an adjective that modifies the topic. As such, the token recent may modify the token transactions. The topic modifier semantic role and the topic semantic role may be related to each other.

In another example, a user may utter, or otherwise electronically communicate, show my payment for my credit card. The semantic extraction may tag the token show with an action semantic role. The action semantic role may be a verb of a sentence. The semantic extraction may tag the token payment with topic semantic role. The token payment may be the subject of the token show. The semantic extraction may tag the token credit card with an entity semantic role. The entity semantic role may be a parameter of a topic. The token credit card may be a parameter of the token payment. The topic semantic role and the entity semantic role may be related to each other.

Furthermore, each token classified by a semantic role may belong to a class within an ontology. Each class may include a variety of synonyms. Each class may be related to other classes. For example, a token show may be included in a view class. The view class may include the following synonyms: display, show, view, retrieve, see and any other suitable synonyms. The view class may be tagged as an action class. The view class may be related to a topic class named transaction. The transaction class may include the following synonyms: purchase, charge, order and any other suitable synonyms.

The ontology may be able to determine a relationship between two tokens by identifying the classes of the tokens. In some embodiments, the ontology may rewrite the utterance using the class name. For example, the ontology may rewrite the utterance show my recent charges with view my recent transactions. As such, the ontology may enable the system to identify the intent of the utterance and thereby identify a response to the utterance.

It should be noted that the ontology may include the relationships between classes. As such, classes may be related to each other within the ontology. Also, classes may be easily updated with additional synonyms. Therefore, the ontology may not create a set of relationships for each additional word. Rather, the word may be added to the class as a synonym. As such, the word may be functional within the ontology without additional preparation within the ontology.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows an illustrative table in accordance with principles of the disclosure;

DETAILED DESCRIPTION OF THE DISCLOSURE

Figure 1:
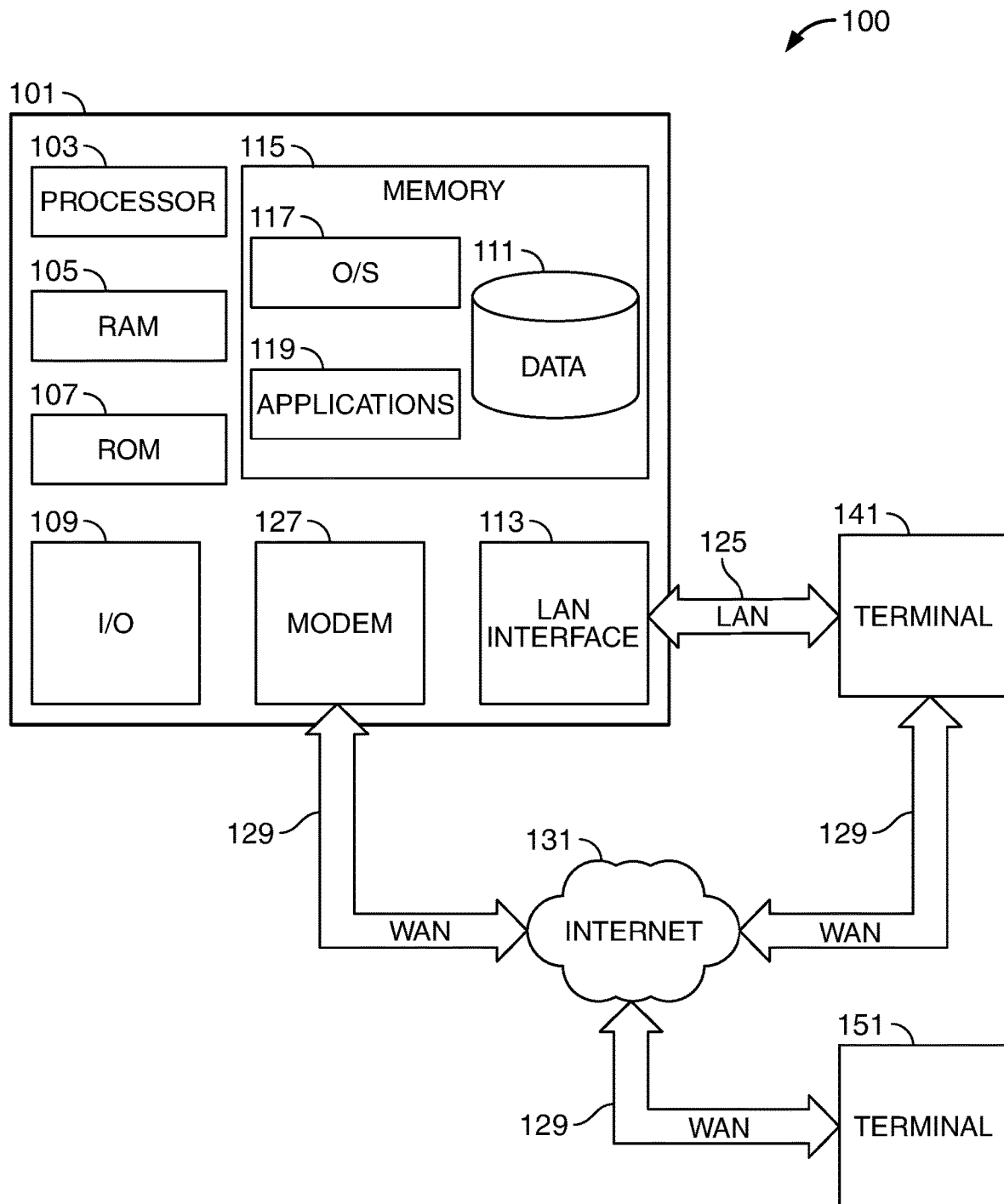
FIG. 1 shows an illustrative diagram in accordance with principles of the disclosure.

Apparatus and methods for an action topic ontology may be provided.

A method for parsing an utterance using an Interactive Voice Response (IVR) is provided. The method may include receiving an utterance, tokenizing the utterance into a plurality of tokens and determining which of the plurality of tokens is a candidate for semantic role classification.

The method may further include identifying a semantic role classifier for each of the tokens that was determined to be a candidate for semantic role classification. The method may include determining that one of the semantic role classifiers is an action. The method may include determining that one of the semantic role classifiers is a topic. The method may include determining that one of the semantic role classifiers is a topic modifier. The method may include determining that one of the semantic role classifiers is an entity.

Thereafter, the method may include determining a first class, within an action topic ontology, that corresponds to the token that is classified as an action and determining a second class, within the action topic ontology, that corresponds to the token that is classified as a topic. The method may also determine classes for the token classified as a topic modifier and the token classified as an entity.

Finally, the method may include using the action topic ontology, the first class and the second class to determine a vector that defines a relationship between the token that is classified as an action and the token that is classified as a topic.

In certain embodiments, the relationship between the token that is classified as an action and the token that is classified as a topic is as follows: the token that is classified as a topic is a subject of the token that is classified as the action.

The method may, in certain embodiments, use the relationship between the token that is classified as an action and the token that is classified as a topic to determine a response to the utterance.

The method may include presenting the response to the user. The presenting may involve any suitable presentation platform. As such, the response may be displayed on an application on the user's mobile device. The response may be a voice response transmitted via a telephonic communication line. The response may be transmitted as a short messaging service ("SMS") or multimedia messaging service ("MMS") to the user's mobile device.

In some embodiments, the method may include determining that one of the semantic role classifiers is a topic modifier. The method may then use the action topic ontology to determine a second vector. The second vector may define a relationship between the token that is classified as an action, the token that is classified as a topic and the token that is classified as a topic modifier. In one embodiment, the relationship between the token that is classified as an action, the token that is classified as topic and the token that is classified as a topic modifier is as follows: the token that is classified as a topic modifier is an adjective that describes the token that is classified as a topic, and the token that is classified as a topic is a subject of the token that is classified as an action.

The method may include determining that one of the semantic role classifiers is an entity. The method may include using the action topic ontology to determine a second (or third) vector that defines a relationship between the token that is classified as an action, the token that is classified as a topic and the token that is classified as topic modifier. The relationship between the token that is classified as an action, the token that is classified as a topic and the token that is classified as an entity is as follows: the token that is classified as an entity is a parameter of the token that is classified as a topic and the token that is classified as a topic is a subject of the token that is classified as an action.

In some embodiments, the method may include identifying a first communication channel from which the utterance was received and transmitting the response to the user via the first communication channel. The first communication channel may be selected from a plurality of communication channels.

In these embodiments, the plurality of communication channels may include a telephone call communication channel, a voice message communication, a chat messaging communication channel, a short messaging service ("SMS") communication channel, a multimedia messaging service ("MMS") communication channel and an e-mail communication channel.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as email, SMS, and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving Artificial Intelligence (AI).

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
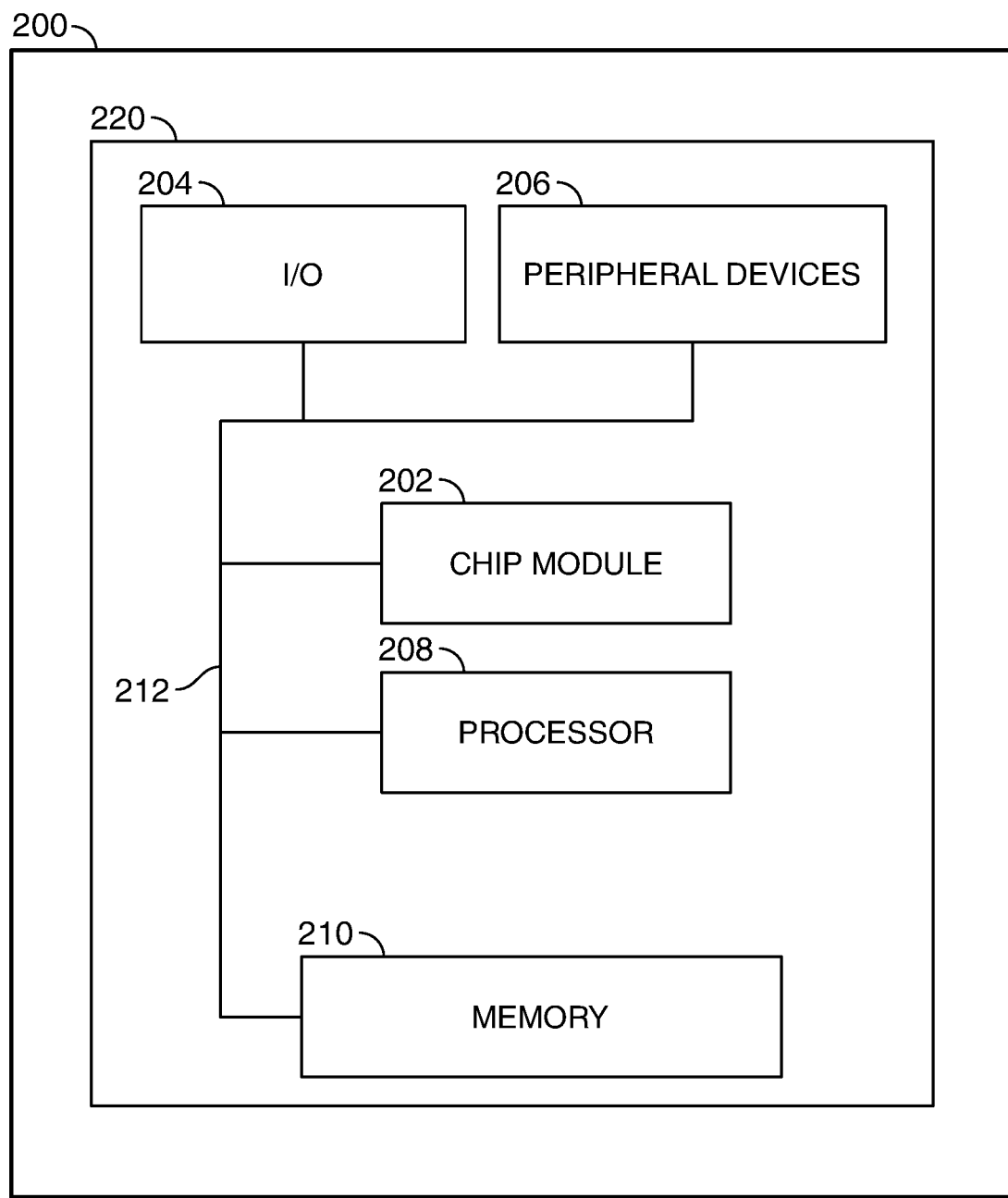
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
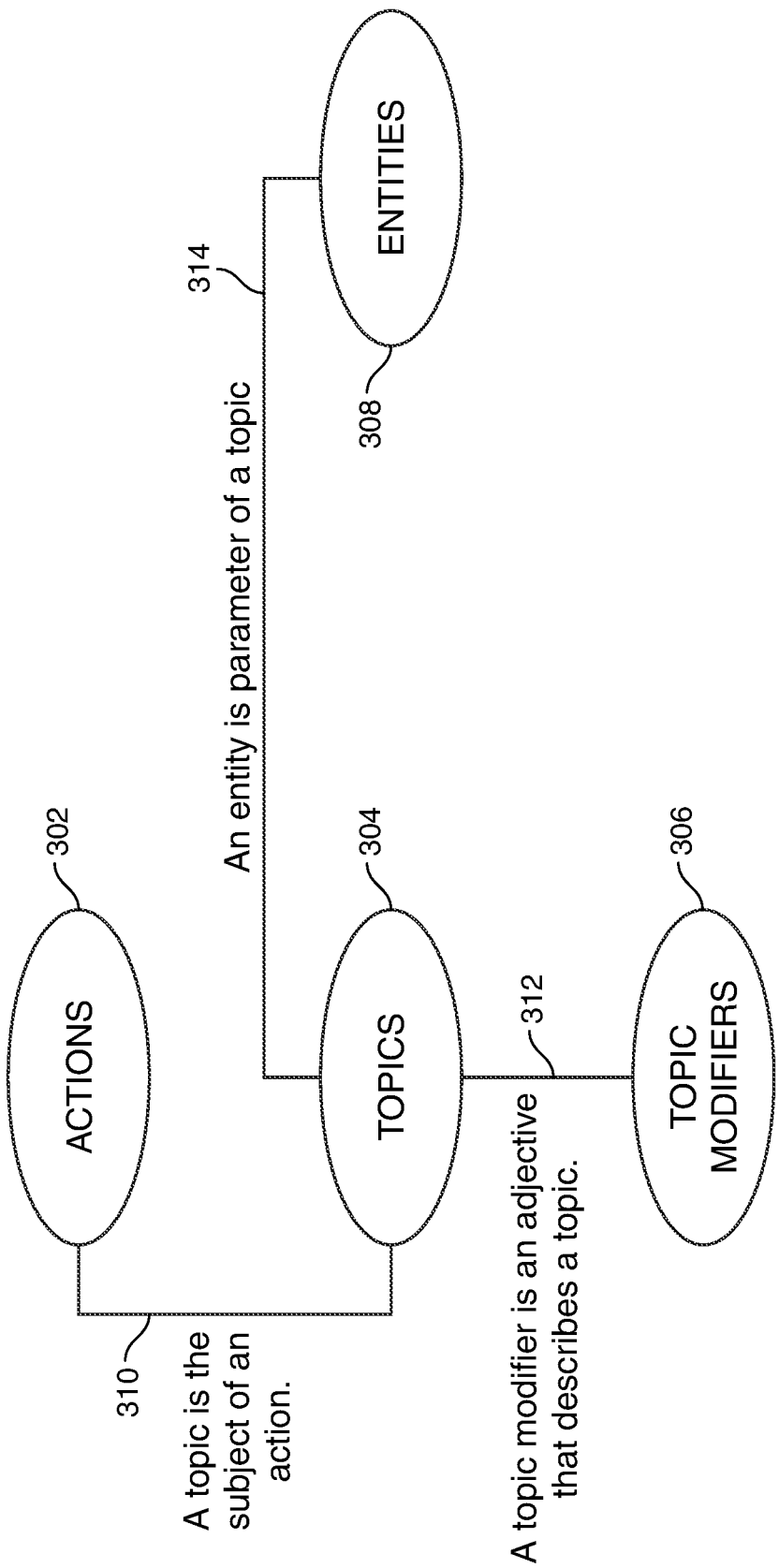
FIG. 3 shows yet another illustrative diagram in accordance with principles of the disclosure.

FIG. 3 shows an illustrative diagram. The illustrative diagram may show a high-level knowledge graph. The high-level knowledge graph may represent an illustrative action topic ontology.

The illustrative diagram shows a plurality of semantic role classifiers and the relationships between the semantic role classifiers. The semantic role classifiers may include actions 302, topics 304, topic modifiers 306 and entities 308.

Actions 302 may refer to what is happening in a sentence. Actions 302 may preferably be a verb part of speech. Actions 302 may have one associated topic.

Topics 304 may refer to what the action is happening. Topics 304 may preferably be a noun, pronoun or compound noun part of speech.

Topic modifiers 306 may refer to a word describing the topic. Topic modifiers 306 may preferably be an adjective part of speech. Topic modifiers 306 may describe the when, where, or how of the topic.

Entities 308 may refer to a parameter of a topic. Entities 308 may preferably be a noun or compound noun part of speech.

The relationships between the semantic role classifiers may be shown at 310, 312 and 314. Relationship 310 may indicate that a topic is the subject of an action. Relationship 312 may indicate that a topic modifier is an adjective that describes a topic. Relationship 314 may indicate that an entity is a parameter of a topic.

FIG. 4 shows illustrative table 402. Illustrative table 402 shows definitions of semantic role classifiers. Each semantic role classier is shown on a row.

A first row, shown at 404, shows an action semantic role classifier. The action semantic role classifier may identify what is happening in a sentence. The action semantic role classifier may be a verb part of speech. Each action, within an utterance, may be associated with one topic.

A second row, shown at 406, shows a topic semantic role classifier. The topic semantic role classifier may identify to what the action is happening. The topic semantic role classifier may be a noun or compound noun part of speech.

A third row, shown at 408, shows a topic modifier semantic role classifier. The topic modifier semantic role classifier may identify a term describing the topic. The topic modifier semantic role classifier may be an adjective part of speech. The topic modifier semantic role classifier may identify the when, where and/or how of the topic.

A fourth row, shown at 410, shows an entity semantic role classifier. The entity semantic role classifier may identify a parameter of the topic. The entity semantic role classifier may be a noun or compound noun part of speech.

Figure 5:
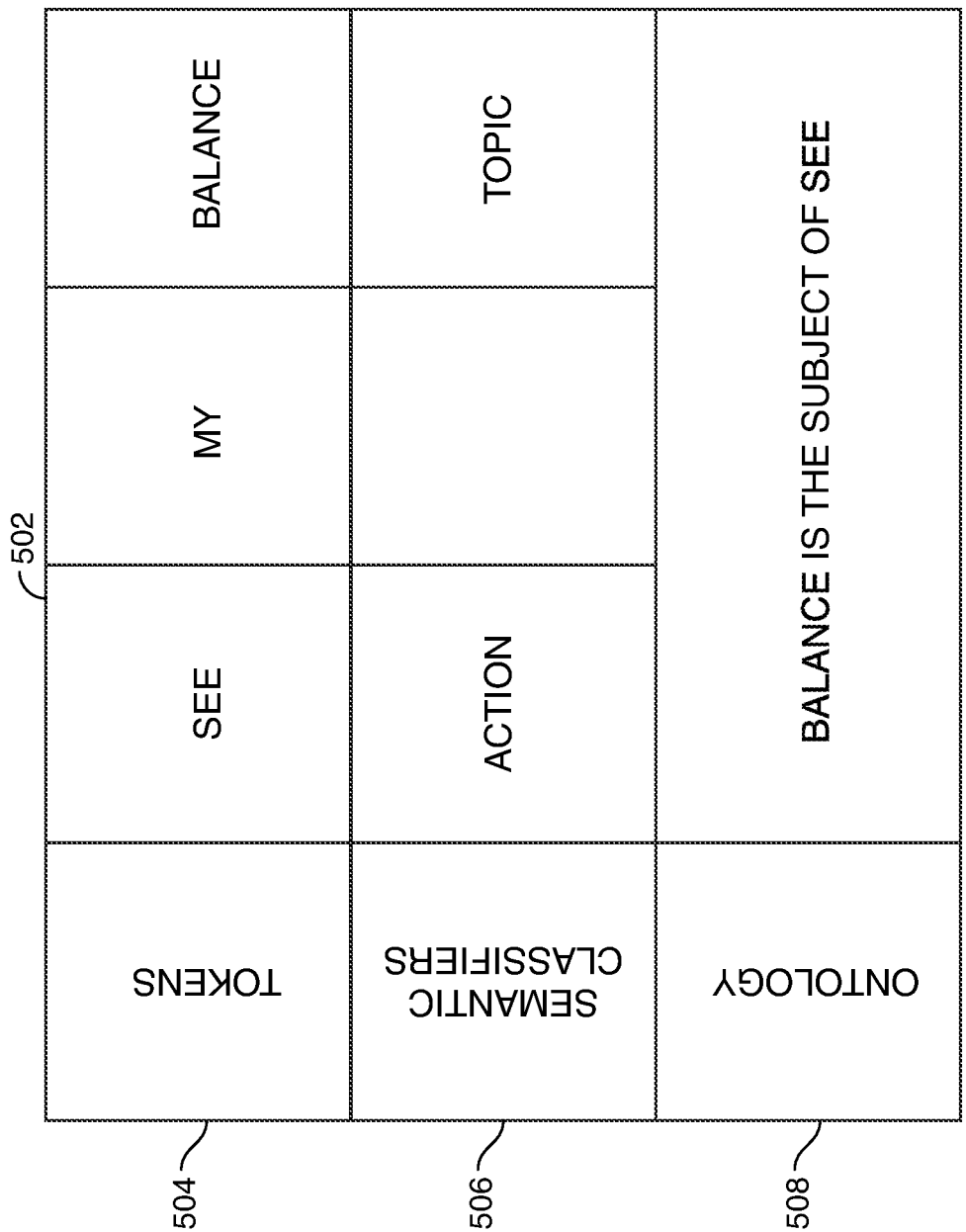
FIG. 5 shows another illustrative table in accordance with principles of the disclosure.

FIG. 5 shows illustrative table 502. Illustrative table 502 shows the processing of an utterance. The utterance received may be show my balance.

The utterance may be divided into tokens, as shown at 504. A first token may be show, a second token may be my and a third token may be balance.

Tokens, that are candidates for semantic role classification, may be selected. Tokens see and balance may be candidates for semantic role classification, as shown at 506. The token see may be classified as an action. The token balance may be classified as a topic.

It should be noted that the token my may not be a candidate for semantic role classification. Candidates may be selected based on whether the token can fit into a knowledge graph of the sentence. Additional tokens, pronouns and/or determiners may not be candidates for semantic role classification.

The tokens and the associated semantic role classifiers may be processed by an action topic ontology. The action topic ontology may determine that balance is the subject of see, as shown at 508.

Figure 6:
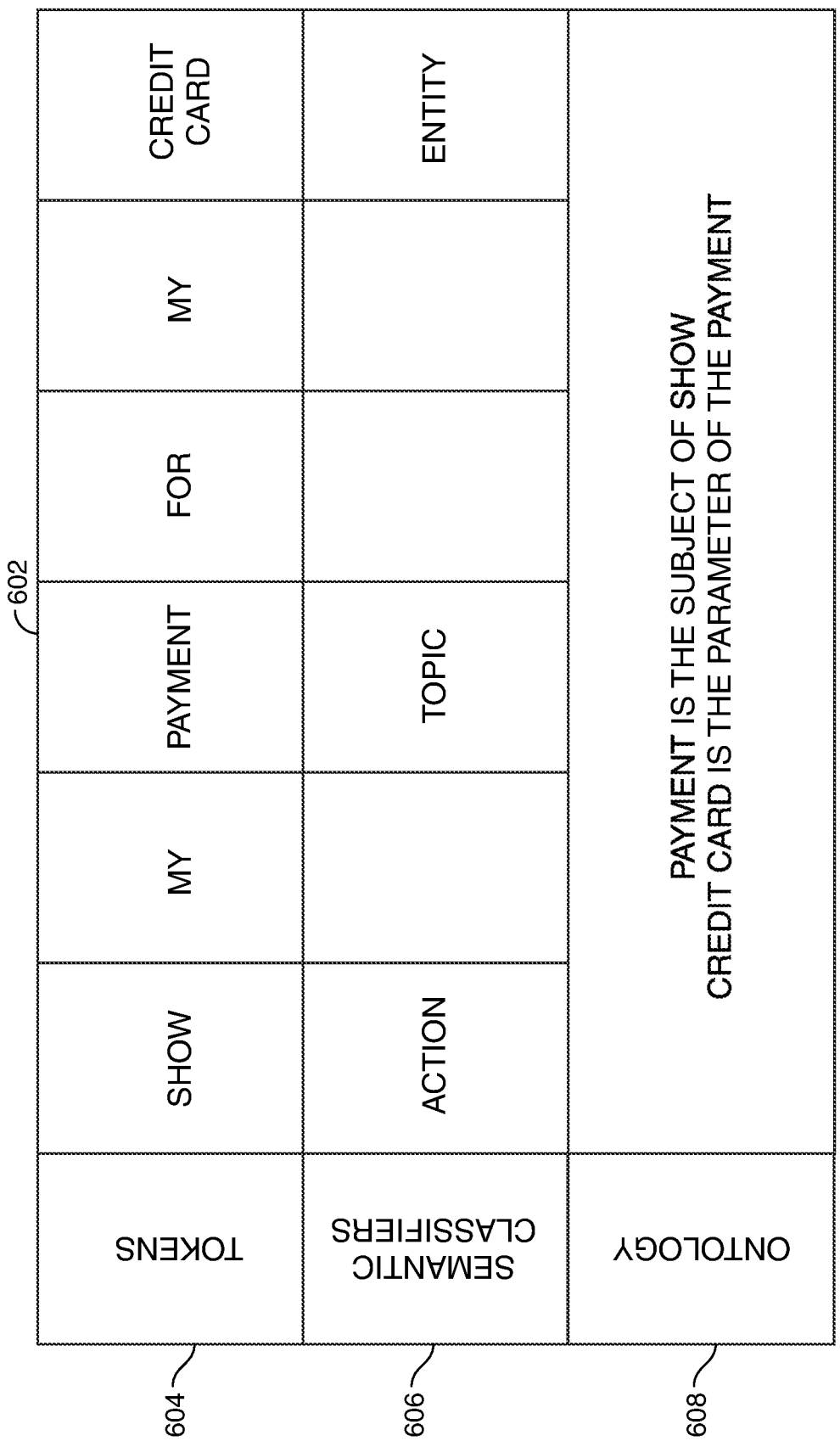
FIG. 6 shows yet another illustrative table in accordance with principles of the disclosure.

FIG. 6 shows illustrative table 602. Illustrative table 602 shows the processing of an utterance. The utterance received may be show my payment for my credit card.

The utterance may be divided into tokens, as shown at 604. A first token may be show, a second token may be my, a third token may be payment, a fourth token may be for, a fifth token may be my and a sixth token may be credit card.

Tokens, that are candidates for semantic role classification, may be selected. Tokens show, payment and credit card may be candidates for semantic role classification, as shown at 606. The token show may be classified as an action. The token payment may be classified as a topic. The token credit card may be classified as an entity.

It should be noted that the tokens my, for and my may not be candidates for semantic role classification. Candidates may be selected based on whether the token can fit into a knowledge graph of the sentence. Additional tokens, pronouns and/or determiners may not be candidates for semantic role classification.

The tokens and associated semantic role classifiers may be processed by an action topic ontology. The action topic ontology may determine that payment is the subject of show, and credit card is the parameter of the payment.

Figure 7:
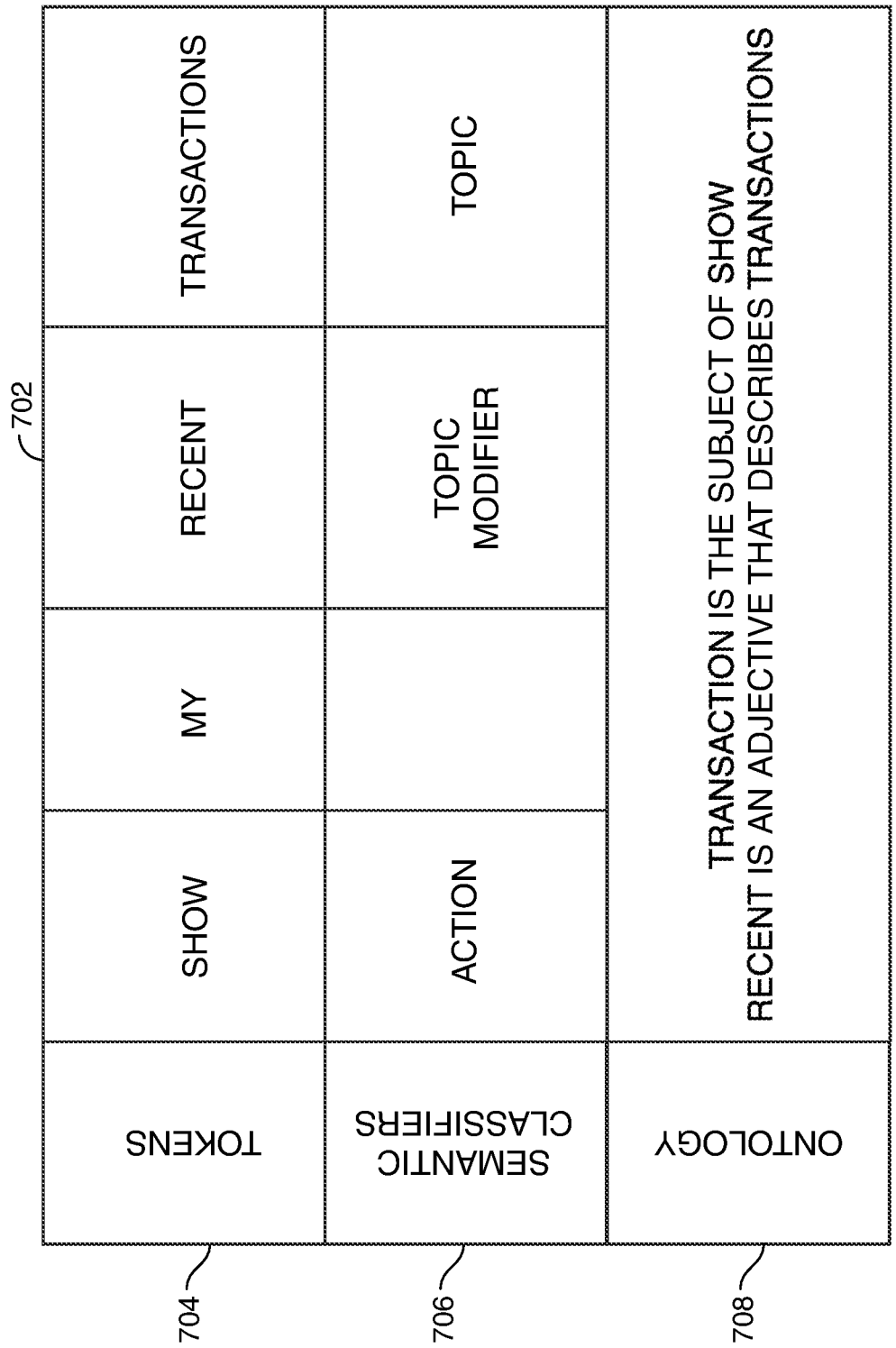
FIG. 7 shows still another illustrative table in accordance with principles of the disclosure.

FIG. 7 shows illustrative table 702. Illustrative table 702 shows the processing of an utterance. The utterance received may be show my recent transactions.

The utterance may be divided into tokens, as shown at 704. A first token may be show, a second token may be my, a third token may be recent and a fourth token may be transactions.

Tokens, that are candidates for semantic role classification, may be selected. Tokens show, recent and transactions may be candidates for semantic role classification, as shown at 706. The token show may be classified as an action. The token recent may be classified as a topic modifier. The token transactions may be classified as a topic. The token transactions may be classified as a topic.

It should be noted that the token my may not be a candidate for semantic role classification. Candidates may be selected based on whether the token can fit into a knowledge graph of the sentence. Additional tokens, pronouns and/or determiners may not be candidates for semantic role classification.

The tokens and associated semantic role classifiers may be processed by an action topic ontology. The action topic ontology may determine that transactions is the subject of show, and recent is an adjective that describes transactions.

Figure 8:
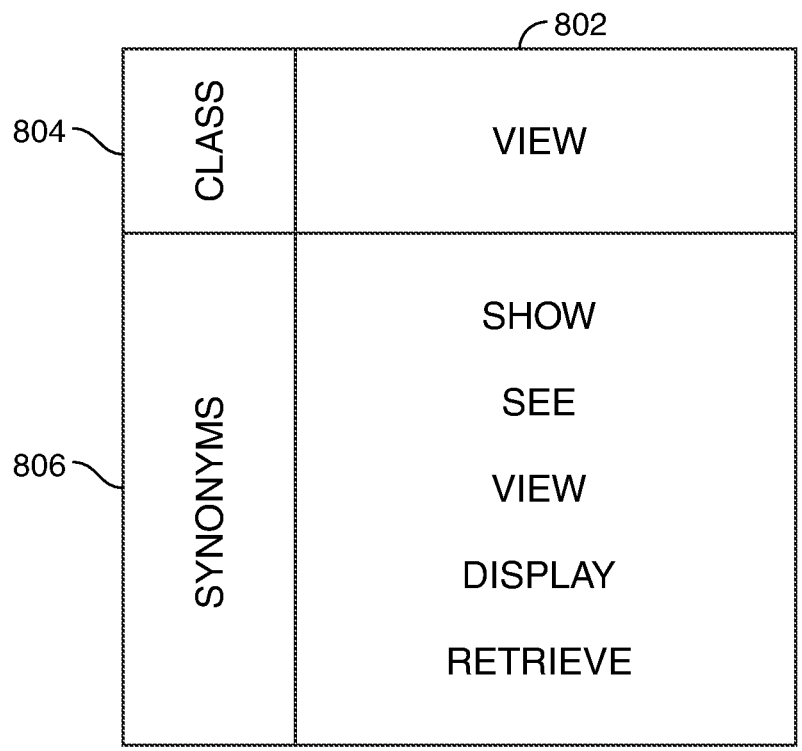
FIG. 8 shows yet another illustrative table in accordance with principles of the disclosure.

FIG. 8 illustrative table 802. Illustrative table 802 includes a class, as shown at 804. The class may have a title. The title of the class may be view. Synonyms of the class may be shown at 806. The synonyms of the class may include the following: show, see, view, display and retrieve. The class may be used within the ontology to define relationships between tokens within an utterance.

Figure 9:
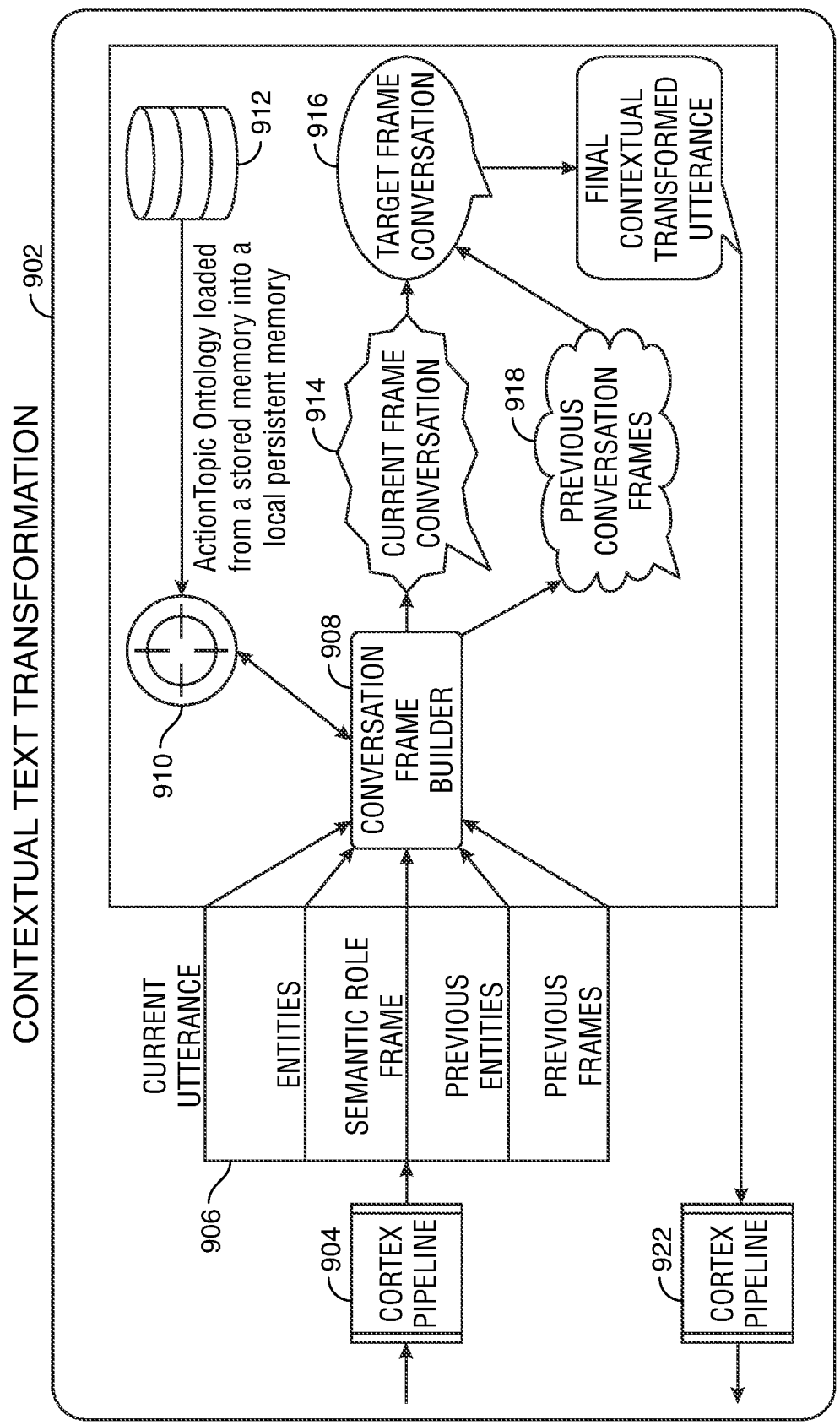
FIG. 9 shows a schematic illustration in accordance with the principles of the disclosure.

FIG. 9 shows a schematic illustration of selectively invoking a contextual text transformation 902. Contextual text transformation 902 may utilize conversation frame builder 908 to build a frame for a conversation. Conversation frame may utilize an action topic ontology.

Contextual text transformation 902 determines when to invoke context to determine intent, or to play a part in determining intent. Preferably, context may be invoked based on specific conditions. For example, in certain circumstances, context may be skipped if the user input comes in the form of a tap or selection on a device. But in the case of an utterance, the intent prediction from the current utterance and its score may also be used to determine if contextual text transformation 902 should be attempted.

The cortex input pipeline is shown at 904. Pipeline 904 is preferably configured to receive inputs such as a current utterance 906 from a user or from another suitable source. Current utterance 906 may include for example entities, semantic role frames, previously identified entities, previous frames and/or other suitable information. It should be noted that, for the purposes of this application, frames refer to collections of words in a sentence or statement, collections of statements in a conversation, or any other suitable collection of constituents that may be used to determine an intent of a word or statement.

At 908, a selected number of previous utterances and related details are passed to the system at a conversation frame builder 908. Conversation frame builder 908 preferably initiates and assembles a framework for the conversation in which the utterances occur.

At 910, action/topic ontology (which draws from a stored memory into a local persistent memory, as shown at 912) may be used to build a conversation frame for the current utterance and to target a relevant action or topic for the utterance. The conversation frame may include semantic role-tagged tokens and relationships between the semantic role-tagged tokens, retrieved from the action/topic ontology.

Following such a build—the current conversation frame 914 may be merged with the information from previous conversation frames 918, to be included in the final target conversation frame 916. Final target conversation frame 916 provides a summary of the conversation at the current point.

At 920, the target conversation frame is validated and leveraged to form the final contextual transformed utterance. The validation preferably serves as a guardrail so that the system does not continue looping over older information even if current utterance does not have any relevant information. Then, based on heuristics, the validation helps generate the final contextual transformed utterance with additional signals, hence giving an enhanced utterance which can be used to understand the user input in the context of the conversation.

In conclusion, contextual text transformation 902 may be used to return a modified contextual utterance if found, as shown at 922.

As such, contextual text transformation 902 has been shown to use an existing model to predict intent and entities based at least in part on the enhanced contextual utterance.

Thus, systems and methods for an action topic ontology are provided. Persons skilled in the art will appreciate that the present invention can be practiced by other than the described embodiments, which are presented for purposes of illustration rather than of limitation. The present invention is limited only by the claims that follow.

What is claimed is:

1. A method for parsing an utterance using an interactive voice response system ("IVR"), said method comprising:
   receiving an utterance at the IVR, said utterance received from a user interacting with the IVR via a communication channel;
   tokenizing the utterance into a plurality of tokens;
   dynamically extracting, from the utterance, a plurality of semantic roles, said dynamically extracting comprising:
      determining two or more tokens, included in the plurality of tokens, are candidates for semantic role classification, each of the two or more tokens being a key component of the utterance;

tagging each key component with a semantic role classifier, said semantic role classifiers being selected from a group of semantic role classifiers including: an action, a topic, a topic modifier, an entity, a question and a negation;

determining that one of the semantic role classifiers tagged to a key component is an action, said action being a verb of the utterance;

determining that one of the semantic role classifiers tagged to a key component is a topic, said topic being a subject of the utterance;

determining a first class, within an action topic ontology structured as a static knowledge graph data structure, that corresponds to the token that is classified as an action;

determining a second class, within the action topic ontology structured as a static knowledge graph data structure, that corresponds to the token that is classified as a topic;

using the action topic ontology structured as a static knowledge graph data structure, the first class and the second class to determine a vector that defines a relationship between the token that is classified as an action and the token that is classified as a topic; and based on the vector, identifying an intent that corresponds to the utterance;

generating a corresponding response to the intent; and transmitting the corresponding response to the user via the communication channel.

2. The method of claim 1, wherein the relationship between the token that is classified as an action and the token that is classified as a topic is: the token that is classified as a topic is a subject of the token that is classified as the action.

3. The method of claim 1, the method further comprising:
determining that one of the semantic role classifiers is a topic modifier; and
using the action topic ontology to determine a second vector that defines a relationship between the token that is classified as an action, the token that is classified as a topic and the token that is classified as a topic modifier, the relationship between the token that is classified as an action, the token that is classified as topic and the token that is classified as a topic modifier is: the token that is classified as a topic modifier is an adjective that describes the token that is classified as a topic, and the token that is classified as a topic is a subject of the token that is classified as an action.

4. The method of claim 1, the method further comprising:
determining that one of the semantic role classifiers is an entity; and
using the action topic ontology to determine a second vector that defines a relationship between the token that is classified as an action, the token that is classified as a topic and the token that is classified as an entity, the relationship between the token that is classified as an action, the token that is classified as a topic and the token that is classified as an entity is: the token that is classified as an entity is a parameter of the token that is classified as a topic and the token that is classified as a topic is a subject of the token that is classified as an action.

5. The method of claim 1, wherein the communication channel is selected from a plurality of communication channels.

6. The method of claim 5, wherein the plurality of communication channels comprises a telephone call communication channel, a voice message communication, a chat messaging communication channel, a short messaging service ("SMS") communication channel, a multimedia messaging service ("MMS") communication channel and an email communication channel.

7. An utterance parsing system, the system comprising:
an interactive voice response system ("IVR");
a receiver operating on a hardware processor operating in tandem with a hardware memory, the receiver operable to receive an utterance from the IVR via a communication channel;
a tokenizer operating on the hardware processor, said tokenizer operable to tokenize the utterance into a plurality of tokens;
a dynamic semantic role classifier extractor operating on the hardware processor, said dynamic semantic role classifier extractor operable to:
determine two or more tokens included in the plurality of tokens that are candidates for semantic role classification, each of the two or more tokens being a key component of the utterance;
tag each key component with a semantic role classifier, said semantic role classifiers being selected from a group of semantic role classifiers including: an action, a topic, a topic modifier, an entity, a question and a negation;
determine that one of the semantic roles tagged to a key component is an action, said action being a verb of the utterance;
determine that one of the semantic roles tagged to a key component is a topic, said topic being a subject of the utterance;
determine a class that corresponds to the token that is classified as an action; and
determine a class that corresponds to the token that is classified as a topic;
an action topic ontology structured as a static knowledge graph data structure stored within the hardware memory, said action topic ontology comprising:
the class that corresponds to the token that is classified as an action;
the class that corresponds to the token that is classified as a topic; and
one or more relationships between the class that corresponds to the token that is classified as an action and the class that corresponds to the token that is classified as a topic; and
a semantic relationship builder operating on the hardware processor, said semantic relationship builder operable to:
use an action topic ontology structured as a static knowledge graph data structure to determine a vector that defines a relationship between the token that is classified as an action and the token that is classified as a topic; and
a response component, said response component operable to:
generate an intent for the utterance based on the vector; and
generate a response corresponding to the intent;
transmit the response to the user via the communication channel.

8. The system of claim 7, wherein the relationship between the token that is classified as an action and the token that is classified as a topic is: the token that is classified as a topic is a subject of the token that is classified as an action.

9. The system of claim 7, wherein:
the semantic role classifier is further operable to:

determine that one of the semantic roles is a topic modifier;
determine a class that corresponds to the token that is classified as a topic modifier;
the action topic ontology further comprises:
the class that corresponds to the token that is classified as a topic modifier;
one or more relationships between the class that corresponds to the token that is classified as an action, the class that corresponds to the token that is classified as a topic and the class that corresponds to the token that is classified as a topic modifier; and
the semantic relationship builder is further operable to:
use the action topic ontology to determine a second vector that defines a second relationship between the token that is classified as an action, the token that is classified as a topic and the token that is classified as a topic modifier.

10. The system of claim 9, wherein the second relationship is the token that is classified as a topic modifier is an adjective that describes the token that is classified as a topic, and the token that is classified as a topic is a subject of the token that is classified as an action.

11. The system of claim 7, wherein:
the semantic role classifier is further operable to:
determine that one of the semantic roles is an entity;
determine a class that corresponds to the token that is classified as an entity;
the action topic ontology further comprises:
the class that corresponds to the token that is classified as an entity;
one or more relationships between the class that corresponds to the token that is classified as an action, the class that corresponds to the token that is classified as a topic and the class that corresponds to the token that is classified as an entity; and
the semantic relationship builder is further operable to:
use the action topic ontology structured as a static knowledge graph data structure to determine a second vector that defines a second relationship between the token that is classified as an action, the token that is classified as a topic and the token that is classified as an entity.

12. The system of claim 11, wherein the second relationship is the token that is classified as an entity is a parameter of the token that is classified as a topic, and the token that is classified as a topic is a subject of the token that is classified as an action.

13. The system of claim 7, wherein the communication channel is selected from a plurality of communication channels.

14. The system of claim 13, wherein the plurality of communication channels comprises a telephone call communication channel, a voice message communication channel, a chat message communication channel, a short messaging service ("SMS") communication channel, a multimedia messaging service ("MMS") communication channel and an email communication channel.

* * * * *